March 16, 1943. C. E. ANDERSON 2,313,859
METHOD OF MAKING CLASP MEMBERS FOR BELTS AND THE LIKE
Filed Aug. 26, 1942

INVENTOR
Carl E. Anderson,
BY
Wm H Caufield.
ATTORNEY

Patented Mar. 16, 1943

2,313,859

UNITED STATES PATENT OFFICE 2,313,859

METHOD OF MAKING CLASP MEMBERS FOR BELTS AND THE LIKE

Carl E. Anderson, East Orange, N. J., assignor to Eastern Tool & Mfg., Co. Bloomfield, N. J.

Application August 26, 1942, Serial No. 456,457

3 Claims. (Cl. 29—3)

This invention relates to an improved method of making one member of a clasp. The form of clasp is used for securing the ends of belts, straps and the like and is shown and described in my application filed October 18, 1941, Serial Number 415,519.

The member which is the subject of this application is known in the trade as the male member and is used in conjunction with the female member which latter includes two hooks which are arranged to receive a prong and thus secure the members together.

This application is directed to a method of making the male member out of a single piece of wire by subjecting the wire to successive steps in order to bring the two ends of the wire together and utilizing the ends by stamping and flattening in order to provide the central prong of the member.

Figure 1:
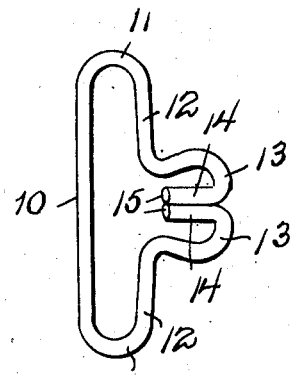
Figure 2:
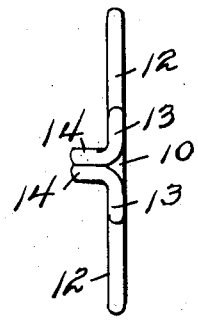
Figure 3:
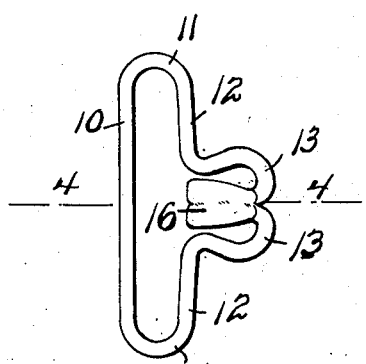
Figure 5:
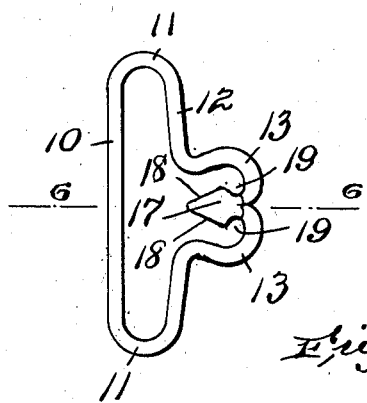
Figure 4:
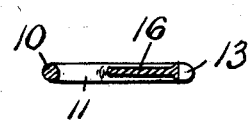
Figure 6:
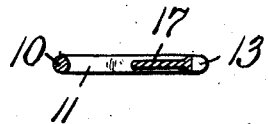

The invention is described hereinafter and in order to more clearly present the invention the accompanying drawing is made part hereof. Figure 1 in said drawing is a face view of a wire bent to form the member with the ends of the wire partly turned in toward the plane of the member. Figure 2 is an edge view of Figure 1. Figure 3 is a face view of the member after the two ends of the wire have been flattened and pressed into the plane of the member. Figure 4 is a section on line 4—4 in Figure 3. Figure 5 is a face view of the member after the flattened ends have been stamped into a spear-head shape to form the completed member. Figure 6 is a section on line 6—6 in Figure 5.

The first step is to form the single piece of wire into the shape of the finished article except for the central prong or spear head. This first step is done in a machine which bends the wire in the form of a frame for attachment to one end of a belt or strap. The frame comprises a rear strand 10 which is bent at the ends 11 and then extends inwardly to form the arms 12. The wire then is formed into outwardly extending separated return bends 13. The ends of the bends, which are the ends 14 of the wire extend inwardly and closely adjacent, the tips 15 terminating short of the line of the arms 12. The ends 14 project at an angle to the plane of the member, that is, the plane of the parts 10, 11, 12 and 13.

In the heavier forms of member, in order to prevent separation of the ends 14 in subsequent operations, they are welded in a welding machine. This is readily and conveniently done by reason of the projection of the ends 14 out of the plane of the member. The welding secures the contacting edges of the ends 14 together and thus causes them to become an integral projecting part.

The next step is to subject the article shown in Figures 1 and 2 to a stamping operation which not only flattens and thins the ends 14 to form a flat plate 16 but forces this plate into the plane of rest of the member and parallel with the return bends 13. This is evident from the showing in Figures 3 and 4.

The member is next stamped to shape the plate 16 into a prong or spear head 17 with inclined top and bottom edges 18 and the recesses 19 for receiving the hooks of the female member.

The article is now complete except for any tumbling if any burrs are evident.

The above described method requires only a single piece of wire, locates the ends of the wire in the central part of the member and utilizes such located ends to form a securing means for the complementary member of the clasp.

It is novel to so form a wire clasp member as a wire member is not only stiff but has greater strength than cast or stamped members which are brittle and are of necessity made more bulky for the requirements of a given size.

I claim:

1. The method of making a member of clasps for belts and the like consisting in the bending of a single piece of wire into a frame comprising a rear strand, bends at the ends of the strand and inwardly extending arms and then extending outwardly from the arms into return bends, the ends of the wire forming the ends of the return bends and lying closely adjacent at an angle to the plane of the frame, then flattening the ends of the wire to form a plate and forcing the plate into the plane of the frame, and then stamping the plate to form a spear head with its broader part adjacent the return bends to form recesses for the reception of hooks of a complementary member.

2. The method of making a member of clasps for belts and the like consisting in the bending of a single piece of wire into a frame comprising a rear strand, bends at the ends of the strands and inwardly extending arms and then extending outwardly from the arms into return bends the ends of the wire forming the ends of the return bends and lying closely adjacent at an angle to the plane of the frame, then welding the closely adjacent ends together, then flattening the ends of the wire to form a plate and forcing the plate into the plane of the frame, and then stamping the plate to form a spear head with its broader part adjacent the return bends to form recesses for the reception of hooks of a complementary member.

3. The method of making a member of a clasp consisting of bending a piece of wire into a frame for receiving the end of a belt or the like, one side of the frame having projecting return bends terminating in centrally arranged ends of the wire lying closely adjacent, flattening the ends of the wire to form a plate and then trimming the plate to the shape of a spear head.

CARL E. ANDERSON.